US011970331B1

(12) United States Patent
Davis

(10) Patent No.: US 11,970,331 B1
(45) Date of Patent: Apr. 30, 2024

(54) PET WASTE CONTAINMENT AND DISPOSAL SYSTEM

(71) Applicant: Gregory R. Davis, Miami, FL (US)

(72) Inventor: Gregory R. Davis, Miami, FL (US)

( * ) Notice: Subject to any disclaimer, the term of this patent is extended or adjusted under 35 U.S.C. 154(b) by 64 days.

(21) Appl. No.: 17/523,260

(22) Filed: Nov. 10, 2021

Related U.S. Application Data

(60) Provisional application No. 63/112,012, filed on Nov. 10, 2020.

(51) Int. Cl.
*B65F 1/00* (2006.01)
*B65F 1/16* (2006.01)

(52) U.S. Cl.
CPC ............ *B65F 1/004* (2013.01); *B65F 1/1607* (2013.01)

(58) Field of Classification Search
CPC ...... B65F 1/004; B65F 1/0046; B65F 1/0033; B65F 1/04; B65F 1/08; B65F 1/1452; B65F 1/1468; B65F 1/16; B65F 1/1607; B65F 2001/1653; B65F 2001/1676
See application file for complete search history.

(56) References Cited

U.S. PATENT DOCUMENTS

| | | | | |
|---|---|---|---|---|
| 3,720,346 | A * | 3/1973 | Cypher | B65F 1/0046 47/85 |
| 4,874,111 | A | 10/1989 | Heller | |
| 4,978,018 | A | 12/1990 | Wood | |
| 5,033,641 | A | 7/1991 | Martin | |
| 5,078,297 | A | 1/1992 | Howard et al. | |
| 5,096,086 | A | 3/1992 | Crema | |
| 5,101,997 | A | 4/1992 | Bagwell et al. | |
| 5,119,957 | A | 6/1992 | Joyce-Middaugh | |
| 5,150,809 | A | 9/1992 | Leigh | |
| 5,190,183 | A | 3/1993 | McNaughton et al. | |
| 5,277,328 | A * | 1/1994 | Tocco | A45C 11/20 220/507 |
| 6,792,628 | B1 | 9/2004 | Humphrey | |
| 7,290,674 | B1 | 11/2007 | Ledford | |
| 2011/0283474 | A1 * | 11/2011 | McCoy | B65F 1/10 15/257.1 |

FOREIGN PATENT DOCUMENTS

| | | |
|---|---|---|
| GB | 2260689 | 4/1993 |

* cited by examiner

*Primary Examiner* — Javier A Pagan
(74) *Attorney, Agent, or Firm* — John Rizvi; John Rizvi, P.A.—The Patent Professor®

(57) ABSTRACT

A pet waste containment and disposal system contains pet waste prior to collection, transport and proper disposal thereof and reduces release of pet waste odors therefrom. A pet waste receptacle assembly has a waste receptacle with an open top, a closed bottom and a sidewall which cooperatively define an internal volume thereof. A cover assembly includes a cover member having a closed top and an outer sidewall disposed therearound disposed into an overlying relation to the open top of the waste receptacle, defining a sealing orientation to reduce release of pet waste odors from the waste receptacle. A partition assembly having at least one partition member separating an internal volume of the waste receptacle into a plurality of waste compartments, wherein each of the plurality of waste compartments is dimensioned and configured to receive an amount of pet waste therein.

17 Claims, 6 Drawing Sheets

PET WASTE CONTAINMENT AND DISPOSAL SYSTEM

CROSS-REFERENCE TO RELATED APPLICATIONS

This application claims the benefit of U.S. Provisional Patent Application Ser. No. 63/112,012 filed on Nov. 10, 2020, which is incorporated by reference herein in its entirety.

FIELD OF THE INVENTION

The present invention relates generally to a pet waste containment and disposal system.

BACKGROUND OF THE INVENTION

There is a well know saying that "a dog is man's best friend". In the United States, there are approximately 100 million dogs kept as pets, which equates to one dog for nearly every 3 to 4 people in the country. The population of this country, and the population in the rest of the world, is becoming more and more concentrated in large urban areas, and as such, the concentration of dogs and other pets in urban areas is rapidly increasing as well.

As a result of this influx of people, dogs and other pets, many urban municipalities now have laws which require pet owners, and in particular, dog owners, to pick up after their pets when they relieve themselves in public places, for example, on our streets, sidewalks, and tree lawns. To assist pet owners in complying with this requirement, waste disposal receptacles specifically designated for the disposal of pet waste are now strategically stationed along sidewalks throughout our cities and suburbs, as well as in designated areas commonly referred to as "dog parks."

Presently, it is common to see men, women, and children, often nicely dressed such as for work or perhaps an evening out, walking one or more dogs in a public or private space with what has now become the ubiquitous green plastic bag in their hand. It is also common to see these same people bending down and picking up the fresh droppings from their pet or pets with a green plastic bag, and then depositing the pet waste into one of the designated waste disposal receptacles or into a garbage can in the vicinity of the private land on which a pet relieved itself. As a result, millions upon millions of the ubiquitous green plastic bags and tons and tons of pet feces are now being thrown into the specifically designated pet waste receptacles which, for the most part, consists of nothing more than an open waste container, as well as in residential garbage cans around the country, and around the world, on a daily basis.

As anyone who has ever walked past one of the numerous designated pet waste receptacles now located throughout our communities and park areas can attest, the little green plastic bags in which pet waste is collected for disposal are essentially ineffective in curbing the release of noxious odors and potentially dangerous vapors emanating from the pet waste contained therein. As a result, the offensive noxious odors emanating from the designated waste disposal receptacles or garbage cans often serve as a beacon for a variety of scavengers including various flying and crawling insects, birds and rodents, who rummage through the pet waste, leading to a spread of the pet waste, and the potentially dangerous pathogens which may be present therein, throughout our communities.

Even if access by the various scavengers noted above is prevented, the pet waste disposed of in the specifically designated pet waste receptacles or the residential or commercial garbage cans is subsequently collected by municipal or private sanitation personnel who risk, often unwittingly, exposure to the potentially dangerous pathogens which may be present in the pet waste disposed of therein.

Furthermore, and again, assuming the pet waste disposed of in the specifically designated pet waste receptacles or the residential or commercial garbage cans is undisturbed or at least relatively undisturbed, in most cases it is simply disposed of in a municipal landfill where it, once again, serves as a beacon for the variety of scavengers who rummage through the pet waste, spreading it and the potentially dangerous pathogens therein throughout our communities.

Another method proposed to facilitate proper and sanitary disposal of pet waste consists of an elaborate and expensive system which involves retrofitting an existing plumbing system of a building, whether residential or commercial, to incorporate an external tie in to a wastewater discharge pipe from the building, leading to a private or municipal wastewater transmission network, or into a septic tank located on or near the site. More in particular, a toilet like structure is installed at ground level adjacent the property and in fluid communication with the wastewater discharge line, which is typically buried many feet below grade. A toilet seat like structure is lifted and the collected pet waste is dropped into the basis, and a separate bucket of water is poured into the basis to "flush" the pet waste into the wastewater discharge line.

Accordingly, there is an established need for a solution to one for more of the aforementioned shortcomings in currently known devices, systems and methods for the containment, collection, transport and disposal of pet waste.

SUMMARY OF THE INVENTION

The present invention is generally directed to a pet waste containment and disposal system.

In a first implementation of the invention, a pet waste containment and disposal system provides sanitary storage of an amount of pet waste prior to collection, transport and proper disposal thereof and reduces a release of pet waste odors to a surrounding environment, the system comprising: a pet waste receptacle assembly having a waste receptacle to contain the amount of pet waste having an open top, a closed bottom and a sidewall disposed thereinbetween, the closed bottom and the sidewall cooperatively defining an internal volume of the waste receptacle; a cover assembly comprising a cover member having a closed top and an outer sidewall disposed therearound, the cover member dimensioned and configured for disposition into an overlying relation to the open top of the waste receptacle and at least partially defining a sealing orientation therewith to reduce the release of pet waste odors from the amount of pet waste contained in the waste receptacle to the surrounding environment; and a partition assembly having at least one partition member disposable into the internal volume of the waste receptacle separating the internal volume into a plurality of waste compartments, wherein each of the plurality of waste compartments is dimensioned and configured to receive a portion of the amount of pet waste therein.

In a second aspect, the pet waste containment and disposal system can include a pet waste receptacle assembly having a handle connected to the waste receptacle to facilitate maneuvering the waste receptacle during collection, transport and proper disposal of the pet waste contained therein, and further, a handle interconnect to connect the handle to the waste receptacle.

In another aspect, the pet waste containment and disposal system may have a waste receptacle further comprising an upper rim disposed around an uppermost periphery of a sidewall.

In a further aspect, the pet waste containment and disposal system can include a cover member having a channel disposed between an outer sidewall and a closed top, the channel dimensioned and configured to operatively engage an upper rim of a waste receptacle in a sealing engagement, wherein the sealing orientation is at least partially defined by the channel of the cover member operatively engaging the upper rim of the waste receptacle.

In one other aspect, the pet waste containment and disposal system may have a waste receptacle comprising a seal seat disposed around at least a portion of an upper end of a sidewall, and a cover assembly further comprising a seal member operatively positioned in the seal seat on the waste receptacle.

In yet another aspect, the pet waste containment and disposal system can include a cover member wherein a sealing orientation is at least partially defined by an outer sidewall of the cover member disposed in an abutting relation to a seal member while the cover member is disposed in an overlying relation to an open top of a waste receptacle.

In still one further aspect, the pet waste containment and disposal system may have a cover member comprising an access port disposed through a portion of a closed top, the access port aligned with at least one of a plurality of waste compartments to allow disposal of a portion of an amount of pet waste thereinto while the cover member remains disposed in an overlying relation to an open top of a waste receptacle.

In even one other aspect, the pet waste containment and disposal system can include a cover member positionable relative to an open top of a waste receptacle such that an access port may be aligned with a different one of each of a plurality of waste compartments to allow disposal of a portion of an amount of pet waste into a different selected one of each of the plurality of waste compartments.

In still another aspect, the pet waste containment and disposal system may have a cover member including an access hatch disposable between an open orientation and a closed orientation relative to an access port, the open orientation at least partially defined by permitting access into and out of a corresponding one of a plurality of waste compartments over which the access port is aligned, and the closed orientation at least partially defined by preventing access into or out of a corresponding one of the plurality of waste compartments over which the access port is aligned.

In even a further aspect, the pet waste containment and disposal system can include a partition assembly having a plurality of partition members disposable into an internal volume of a waste receptacle and separating the internal volume into a plurality of waste compartments, and further, it may have a plurality of partition members separating the internal volume into a total of eight waste compartments such that all but one of the plurality of waste compartments is utilized to contain the amount of pet waste accumulated in a single day.

In yet one other aspect, the pet waste containment and disposal system may have a plurality of partition members each comprising an upper end, a lower end, an outer edge and an interface, wherein a partition wall is at least partially defined between corresponding ones of the upper end, the lower end, the outer edge and the interface of each of the plurality of partition members.

In still another aspect, the pet waste containment and disposal system can include a plurality of partition members being tapered in a downward direction from an upper end to a lower end along an outer edge thereof, and further, a waste receptacle has a tapered configuration extending downward along a sidewall from an upper rim to a closed bottom, wherein the waste receptacle comprises a tapered configuration which corresponds to the tapering of the plurality of partition members.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms “upper”, “lower”. “top”, “bottom”, “left”, “right”, “front”, “rear”, “vertical”, “horizontal”, and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is generally directed to pet waste containment and disposal system.

Figure 1:
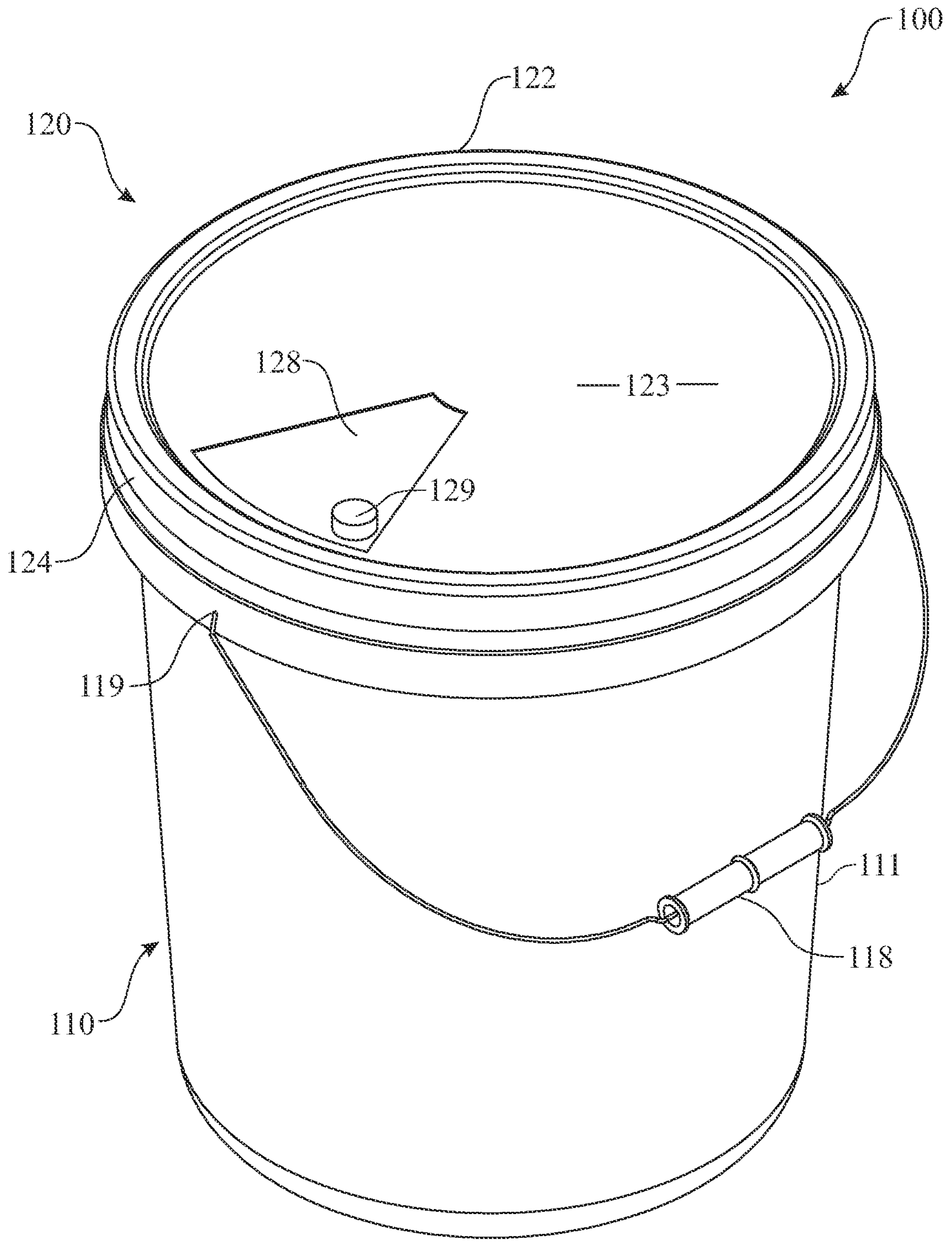
FIG. 1 presents a front perspective view of one illustrative embodiment of a pet waste containment and disposal system, in accordance with the present invention.

Referring initially to FIG. 1, presented therein is a perspective view one illustrative embodiment of a pet waste containment and disposal system, generally as shown as at 100 throughout the figures, in accordance with the present invention. More particular, a pet waste containment and disposal system 100 in accordance with at least one embodiment of the present invention provides a means for sanitary storage of an amount of patent waste both prior to and during collection, transport and proper disposal thereof. Further, the pet waste containment and disposal system 100 in accordance with the present invention reduces release of pet waste odors to a surrounding environment, once again, both prior to and during the collection, transport and proper disposal of an amount of pet waste itself.

A pet waste containment and disposal system 100 comprises a pet waste receptacle assembly 110. With reference again to the illustrative embodiment of FIG. 1, a pet waste receptacle assembly 110 includes a waste receptacle 111. A waste receptacle 111 in accordance with the present invention may be constructed of any of a variety of sufficiently rigid materials of construction including steel, aluminum, stainless steel, metal alloys, engineered plastics, composite materials, etc., just to name a few. In at least one embodiment, a waste receptacle 111 is constructed of a material which may be quickly and easily sanitized for reuse of the waste receptacle 111 after pet waste which had been contained therein has been properly disposed of, such as in a wastewater treatment plant, composting facility, sanitary landfill, etc. In at least one further embodiment, a waste receptacle 111 is constructed of a medical grade material such as is suitable for storage and handling of biological waste. As shown in the illustrative embodiment of FIG. 1, a waste receptacle 111 comprises a cylindrical bucket or pail configuration. It is to be appreciated that a waste receptacle 111 in accordance with the present invention may comprise any of a number of other suitable geometric configurations within the scope and intent of the present invention.

In at least one embodiment of the present invention, a waste receptacle 111 comprises a handle 118 interconnected thereto, as shown throughout the figures, to facilitate maneuvering the waste receptacle 111 during collection, transport and proper disposal of the pet waste contained therein. In at least one further embodiment, a waste receptacle 111 comprises a handle interconnect 119 to connect the handle 118 to the waste receptacle 111, such as is shown by way of example, in the illustrative embodiment of FIG. 1.

As before, a pet waste receptacle assembly 110 includes a waste receptacle 111. With reference to the illustrative embodiment of FIG. 2, a waste receptacle 111 has an open top 112, a closed bottom 114 and a sidewall 115 extending around and between the open top 112 and the closed bottom 114. In one embodiment, an upper rim 113 is formed along around an uppermost periphery of the sidewall 115 in a surrounding relation to the open top 112 of the waste receptacle, such as may be seen best in FIG. 2. In at least one further embodiment, an internal volume 116 of a waste receptacle 111 is at least partially and cooperatively defined by the sidewall 115 and the closed bottom 114. As will be appreciated, in an embodiment wherein a waste receptacle 111 comprises a non-cylindrical configuration such as, by way of example only, a square, rectangular, hexagonal configuration, the waste receptacle 111 may comprise a plurality of sidewalls 115 which collectively and cooperatively define an internal volume 116 of the waste receptacle 111 along with the closed bottom 114.

A pet waste containment and disposal system 100 in accordance with at least one embodiment of the present invention further comprises a cover assembly 120. Looking once again to the illustrative embodiment of FIG. 1, a cover assembly 120 comprises a cover member 122 having a closed top 123 and outer sidewall 124 disposed around the periphery of the closed top 123. As further shown in FIG. 1, a cover member 122 is dimensioned and configured for disposition into an overlying relation to a waste receptacle 111 of a pet waste receptacle assembly 110, in accordance with at least one embodiment of the present invention.

Figure 2:
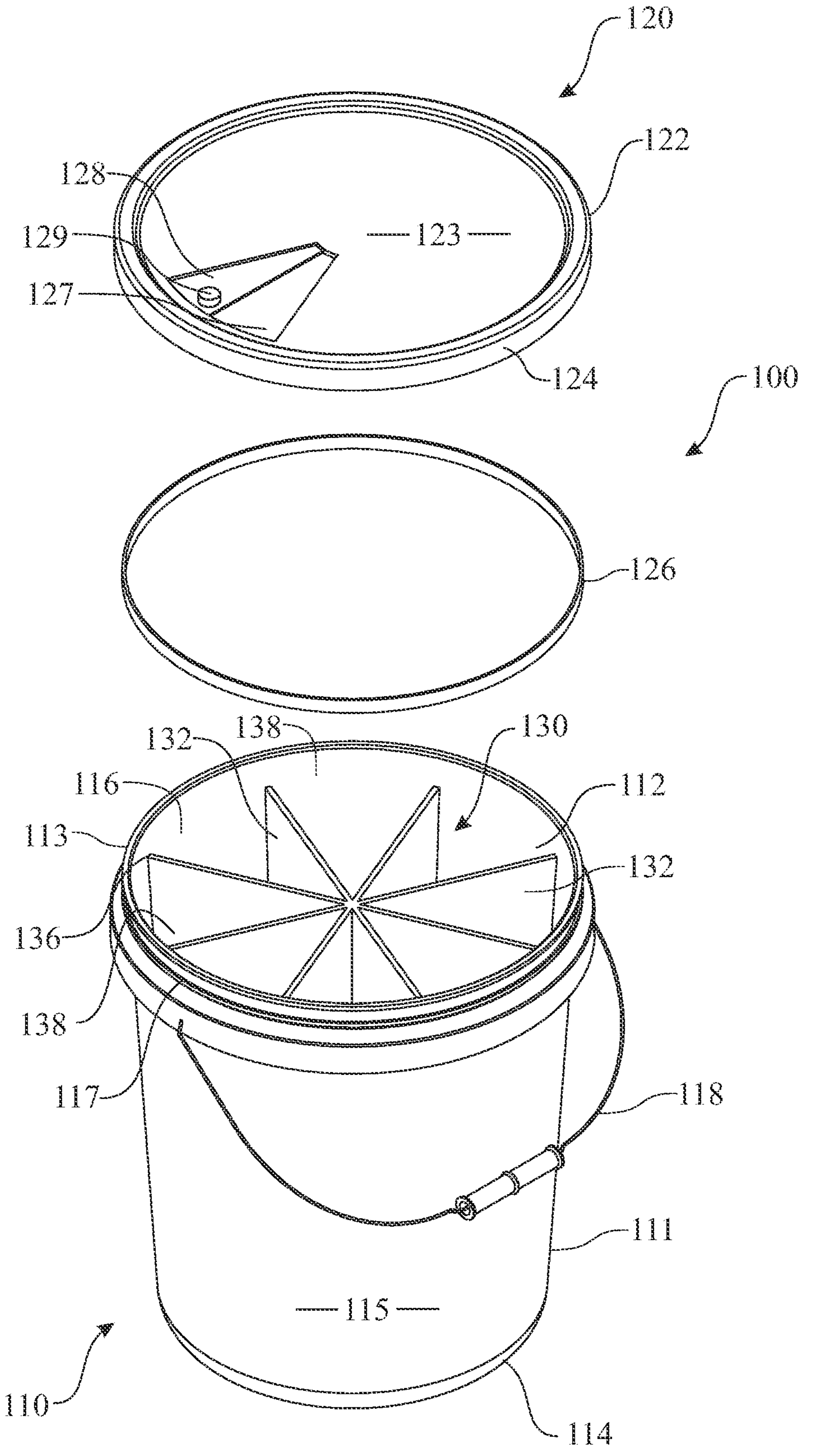
FIG. 2 presents an exploded perspective view of the illustrative embodiment of the pet waste containment and disposal system of FIG. 1, in accordance with the present invention.

FIG. 2 presents an exploded perspective view of the illustrative embodiment of the pet waste containment and disposal system 100 of FIG. 1, in accordance with the present invention. As before, a pet waste containment and disposal system 100 includes a pet waste receptacle assembly 110 and a cover assembly 120. In yet one further embodiment, a pet also includes a partition assembly 130. As one example, and as shown in FIG. 2, the pet waste containment and disposal system 100 includes a partition assembly 130 disposed in an internal volume 116 of the waste receptacle 111, in accordance with the present invention, wherein the partition assembly 130 is configured to separate an internal volume 116 of a waste receptacle 111 into a plurality of waste compartments 138, wherein each of the plurality of waste compartments 138 is dimensioned and configured to receive an amount of pet waste therein. As one example, each of a plurality of waste compartments may be dimensioned to contain an amount of pet waste expected to be accumulated on a daily basis for different types of pets. e.g., small dogs, medium sized dogs, large dogs, and/or combinations or multiples thereof. It is to be appreciated that the present pet waste collection and disposal system 100 may also be dimensioned and configured for the collection, transport and proper disposal of waste from other types of pets including cats, rabbits, monkeys, etc., to name just a few.

FIG. 2 further illustrates one embodiment of a cover assembly 120 in accordance with the present invention. As before, a cover assembly 120 in accordance with at least one embodiment present invention includes a cover member 122. Also as before, and as may be seen from FIG. 2, the cover member 122 includes a closed top 123 having an outer sidewall 124 disposed therearound. In at least one embodiment of the present invention, a cover member 122 is dimensioned and configured for disposition into an overlying relation to an open top 112 of a waste receptacle 111. Similar to a waste receptacle 111 in accordance with the present invention, a cover member 122 of a cover assembly 120 may be constructed of any of a variety of sufficiently rigid materials of construction including steel, aluminum, stainless steel, metal alloys, engineered plastics, composite materials, etc., just to name a few. In at least one embodiment, a cover member 122 is constructed of a material which may be quickly and easily sanitized for reuse of the cover member 122 after pet waste which had been contained in a corresponding waste receptacle 111 has been properly disposed of, once again, such as in a wastewater treatment plant, composting facility, sanitary landfill, etc. In at least one further embodiment, a cover member 122 is also constructed of a medical grade material such as is suitable for storage and handling of biological waste.

In at least one further embodiment, a cover member 122 is dimensioned and configured for disposition into an overlying relation to an open top 112 of a waste receptacle 111 and at least partially defining a sealing orientation between the cover member 122 and the waste receptacle 111 so to reduce, and in some embodiments minimize if not eliminate, a release of pet waste odors from the amount of pet waste contained in the waste receptacle 111 to the surrounding environment. More in particular, a sealing orientation between a cover member 122 and a waste receptacle 111 reduces a release of pet waste odors from the amount of pet waste contained in the waste receptacle 111 to the surrounding environment both prior to and during the collection, transport and proper disposal of the amount of pet waste contained in the waste receptacle 111. As will be appreciated, such a sealing orientation will reduce the exposure of persons who are depositing pet waste into a waste receptacle 111 in accordance with the present invention, as well as those persons responsible for the collection, transport and proper disposal of the pet waste contained in the waste receptacle 111. In at least one embodiment, a sealing orientation comprises a hermetical seal.

In at least one embodiment of a pet waste containment and disposal system 100 in accordance with the present invention, a cover member 122 of a cover assembly 120 further comprises a channel 125 disposed between an outer sidewall 124 and a closed top 123, wherein the channel 125 is dimensioned and configured to operatively engage an upper rim 113 of a waste receptacle 111 in a sealing engagement. A sealing orientation between a cover member 122 of a cover assembly 120 and a waste receptacle 111 of a pet waste receptacle assembly 110 is at least partially defined in at least one embodiment by a channel 125 of the cover member 122 operatively engaging the upper rim 113 of the sidewall of the waste receptacle 111, such as is shown by way of example in FIG. 6, once again, so as to reduce, if not minimize or eliminate altogether, a release of pet waste odors from the pet waste contained in the waste receptacle 111 to the surrounding environment.

With reference once again to the illustrative embodiment of FIG. 2, a cover assembly 120 in accordance with at least one embodiment of the present invention further comprises a seal member 126. A pet waste receptacle assembly 110 includes a waste receptacle 111 having a seal seat 117 disposed at least partially around and along an upper periphery of the sidewall 115 thereof. More in particular, a seal seat 117 is dimensioned and configured to receive at least a portion of the seal member 126 therein such that the seal member 126 is disposable into a sealing relation with at least a portion of the cover member 122 of the cover assembly 120. As shown in FIG. 2, a pet waste receptacle assembly 110 in accordance with at least one embodiment of the present invention includes a waste receptacle 111 comprises a seal seat 117 disposed around an upper periphery of the sidewall 115, wherein the seal seat 117 is dimensioned and configured to operatively receive a seal member 126 therein.

Figure 6:
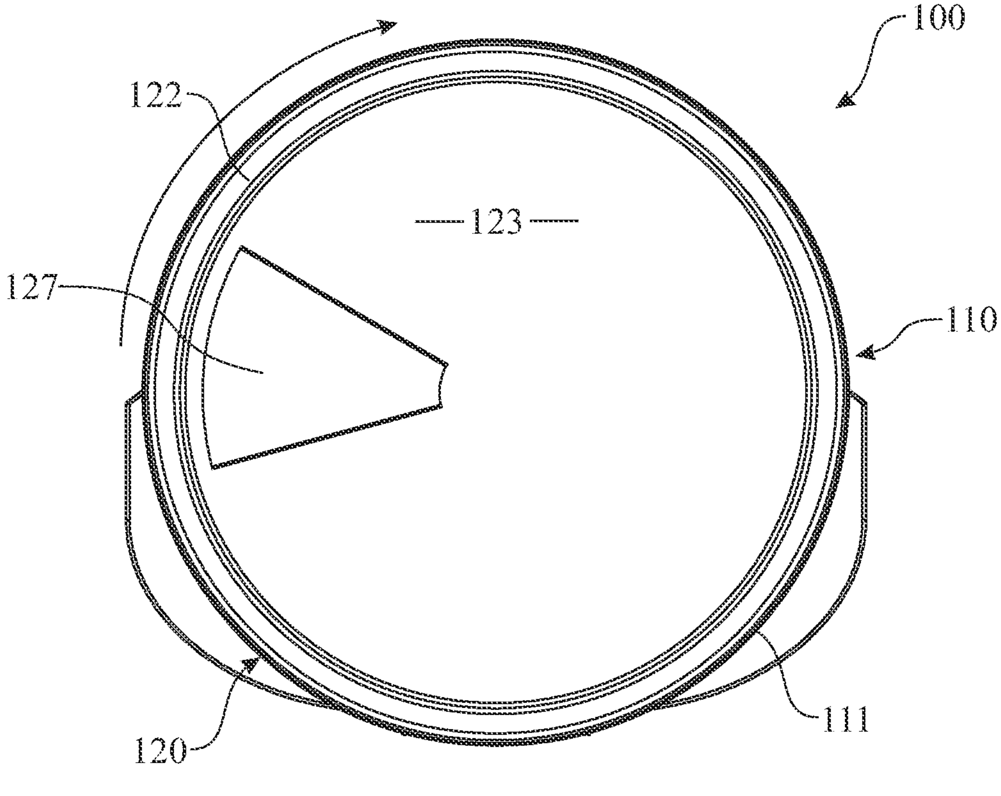
FIG. 6 presents a top plan view of the illustrative embodiment of the pet waste containment and disposal system of FIG. 5 with the access port rotated into a second receiving position, in accordance with the present invention.
Figure 7:
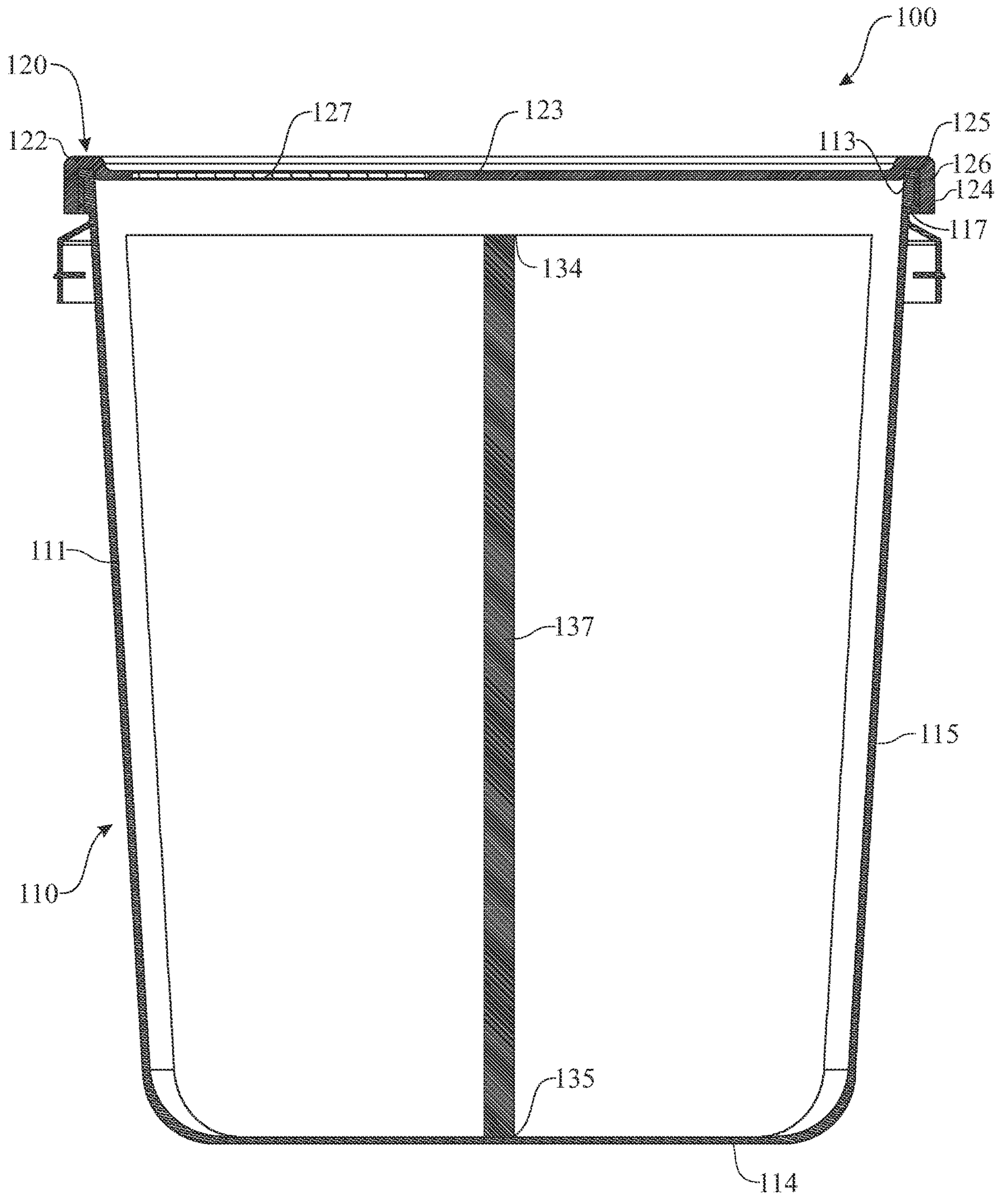
FIG. 7 presents a cross-sectional view of the illustrative embodiment of the pet waste containment and disposal system of FIG. 5 along lines 7-7 thereof, in accordance with the present invention.

In accordance with at least one embodiment of a pet waste containment and disposal system 100, a sealing orientation is at least partially defined by an outer sidewall 124 of a cover member 122 disposed in an abutting relation to a seal member 126 operatively positioned and disposed in a seal seat 117 of a waste receptacle 111, while the cover member 122 is disposed in an overlying relation to an open top 112 of the waste receptacle 111, such as is shown best in FIG. 6, as before, so as to reduce, if not minimize or eliminate, a release of pet waste odors from the pet waste contained in the waste receptacle 111 to the surrounding environment.

A seal member 126 in accordance with at least one embodiment of a pet waste containment and disposal system 100 of the present invention comprises a resilient material of construction, such as, by way of example, natural or synthetic rubber, thereby allowing the seal member 126 to expand for positioning into a seal seat 117 of a waste receptacle 111, as well as to compress to permit an outer sidewall 124 of a cover member 122 to be disposed into an overlying and abutting relation thereto. In at least one further embodiment, a seal member 126 comprises a vapor resistant or vapor impermeable material of constructions, once again, such that when disposed into an abutting relation to an outer sidewall 125 of a cover member 122, a release of pet waste odors from the pet waste contained in the waste receptacle 111 to the surrounding environment is reduced, if not minimized or eliminated altogether.

A cover member 122 of a cover assembly 120 in at least one embodiment of the present pet waste containment and disposal system 100 comprises an access port 127 disposed through a portion of a closed top 123. More in particular, an access port 127 disposed through a closed top 123 of a cover member 122 is aligned with at least one of a plurality of waste compartments 138 so as to allow disposal of a portion of the amount of pet waste directly into a selected one of the plurality of waste compartments 138, importantly, while the cover member 122 remains disposed on and in a sealing orientation with an open top 112 of a waste receptacle 111, once again, so as to reduce, if not minimize or eliminate altogether, a release of pet waste odors from pet waste contained in the waste receptacle 111 to the surrounding environment.

Figure 3:
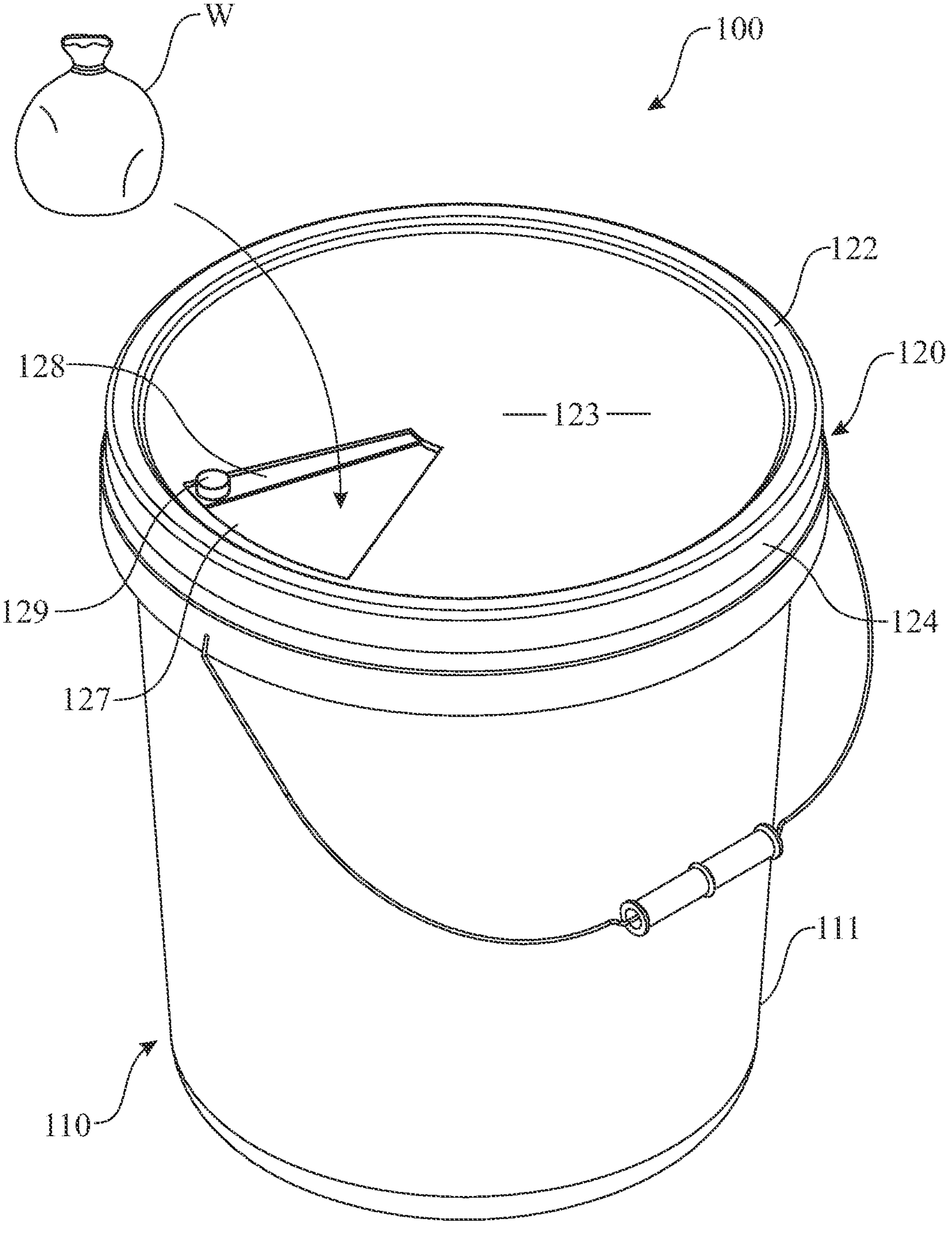
FIG. 3 presents a front perspective view of the illustrative embodiment of the pet waste containment and disposal system of FIG. 1 with an amount of pet waste being disposed of therein, in accordance with the present invention.

In at least one further embodiment, a cover assembly 120 of a pet waste containment and disposal system 100 further comprises an access hatch 128. In accordance with one embodiment, an access hatch 128 is dimensioned and configured so as to be disposable between an open orientation and a closed orientation relative to an access port 127. An open orientation of an access hatch 128 in at least one embodiment is at least partially defined by the access hatch 128 disposed in a retracted relation relative to an access port 127, thereby at least partially exposing the access port 127 through the closed top 123 of the cover member 122 so as to permit access into and out of a corresponding one of a plurality of waste compartments 138 in the internal volume 116 of the waste receptacle 111 over which an access port 127 is aligned. As may be seen best from the illustrative embodiment of FIG. 3, the access hatch 128 is disposed in an open orientation relative to an access port 127. More in particular, and again as shown in FIG. 3, the access hatch 128 is disposed in a retracted relation relative to the access port 127, such that an amount of pet waste, designated as "W" in the figures, may be disposed of through the access port 127 in the closed top 123 of the cover member 122, while the cover member 122 remains disposed in a sealing orientation with the open top 112 of the waste receptacle 111.

In at least one further embodiment, a closed orientation of an access hatch 128 relative to an access port 127 is at least partially defined by the access hatch 128 disposed in an overlying relation relative to the access port 127 thereby preventing access into or out of a corresponding one of the plurality of waste compartments 138 over which the access port 127 is aligned, as well as to prevent the release of pet waste odors from pet waste contained in the waste receptacle through the access port 127. The illustrative embodiment of FIG. 1 of a pet waste collection and disposal system 100 in accordance with the present invention shows an access hatch 128 disposed in a closed orientation relative to an access port 127 (not shown). In at least one embodiment, an access hatch 128 comprises a knob 129 to facilitate disposition of the access hatch 128 between an open orientation and a closed orientation relative to an access port 127.

In at least one further embodiment, a closed orientation of an access hatch 128 relative to an access port 127 is further defined by a vapor tight seal (not shown) disposed between an access port 127 and an access hatch 128, such that pet waste odors from the pet waste contained in a waste receptacle 111 are not released through the access port 127 when the access hatch 128 is disposed in a closed orientation relative to the access port 127. As with seal member 126, such a vapor tight seal may comprise a resilient material of construction to facilitate disposition into a sealing engagement between the access hatch 128 and the access port 127, once again, such that pet waste odors are not released to the surrounding environment.

Figure 4:
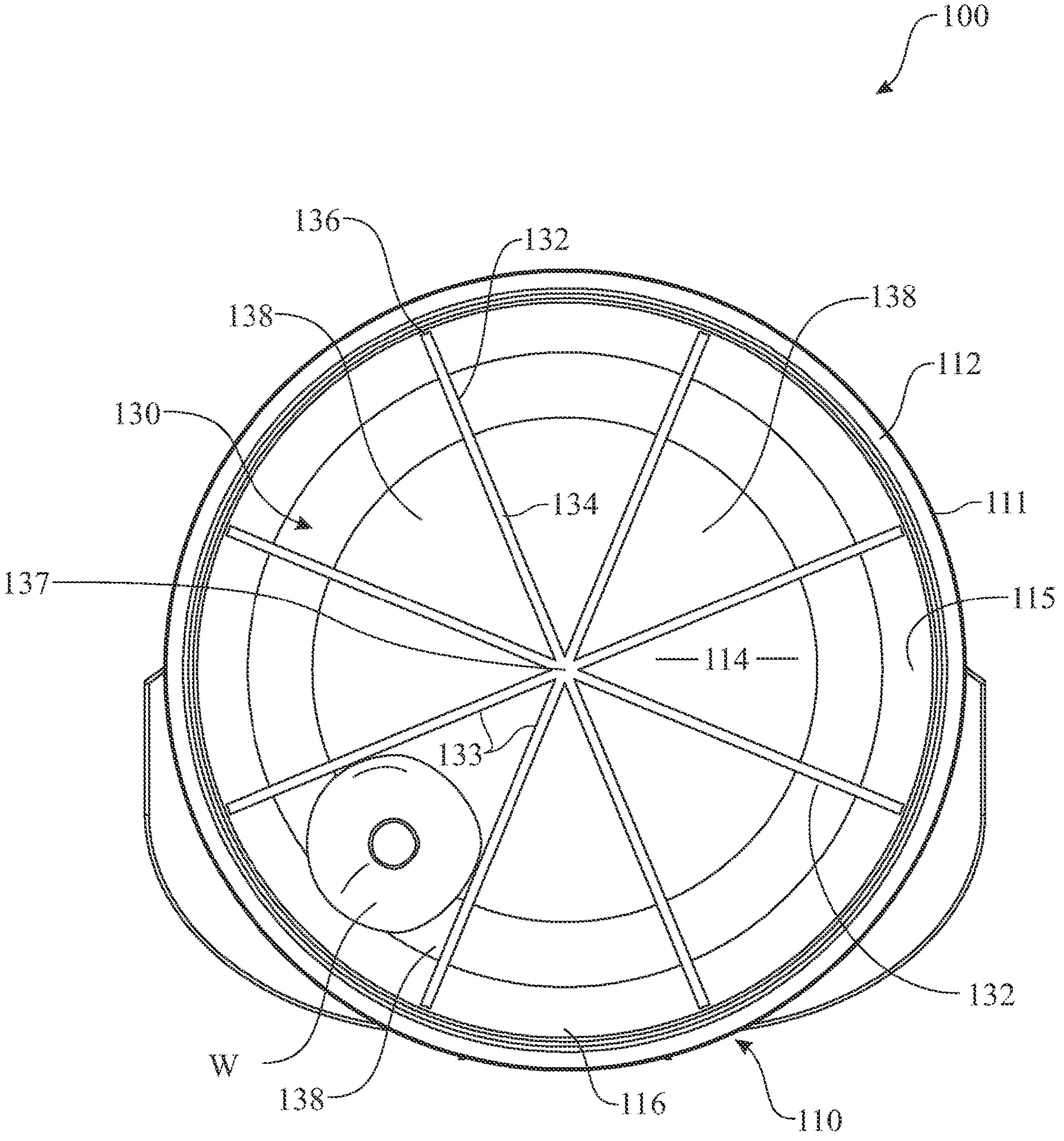
FIG. 4 presents a top plan view of one illustrative embodiment of a pet waste containment and disposal system having an amount of pet waste disposed therein, in accordance with the present invention.

As before, in at least one embodiment, a pet waste containment and disposal system 100 in accordance with the present invention includes a partition assembly 130. A partition assembly 130 in at least one embodiment has at least one partition member 132 disposable into an internal volume 116 of a waste receptacle 111 to separate the internal volume 116 into a plurality of waste compartments 138, such as may be seen best in FIGS. 2 and 4. As further shown in FIG. 4, in at least one embodiment, each of a plurality of waste compartments 138 is dimensioned and configured to receive a portion of pet waste, shown again as “W”, therein. A partition assembly 130 in one further embodiment includes a plurality of partition members 132, wherein each of the plurality of partition members 138 are disposable into an internal volume 116 of a waste receptacle 111 to separate the internal volume 116 into the plurality of waste compartments 138.

Each partition member 132 in accordance with at least one embodiment of the present invention comprises an upper end 134, a lower end 135, an outer edge 136 and an interface 137. A partition wall 133 is at least partially defined between corresponding ones of an upper end 134, a lower end 135, an outer edge 136 and an interface 137 of each of a plurality of partition members 132. As may be seen best in FIG. 4, oppositely disposed partition walls 133 at least partially define a corresponding waste compartment 138 dimensioned and configured to receive an amount of the pet waste “W” therein. In at least one embodiment, the partition members 138 is tapered in a downward direction from an upper end 134 to a lower end 135 along an outer edge 136 thereof. As will be appreciated, tapering the plurality of partition members 132 will facilitate removal of the partition members 132 from a waste receptacle 111 such as may be require from time to time for sanitizing, repair or disposal thereof. In at least one further embodiment, a waste receptacle 111 comprises a tapered configuration extending downward along a sidewall 115 from an upper rim 113 to a closed bottom 114, and in still one further embodiment, a waste receptacle 111 comprises a tapered configuration which corresponds to the tapering of the plurality of partition members 132 of the partition assembly 130, once again, so as to facilitate removal thereof for sanitizing, repair or disposal.

It is to be appreciated that each of a plurality of partition members 132 may be individually manufactured units joined to one another along corresponding interfaces 137 by an appropriate mechanical attachment means. Alternatively, in at least one embodiment, the plurality of partition members 132 are integrally formed and attached to one another along common interface 137, such as is shown, by way of example, in the illustrative embodiments of FIGS. 2 and 4. Further, and similar to a waste receptacle 111 and a cover member 122 in accordance with the present invention, the plurality of partition members 132 may be constructed of any of a variety of sufficiently rigid materials of construction including steel, aluminum, stainless steel, metal alloys, engineered plastics, composite materials, etc., just to name a few. In at least one embodiment, the plurality of partition members 132 are constructed of a material, for example, a medical grade material, which may be quickly and easily sanitized for reuse after pet waste which had been contained in a corresponding waste receptacle 111 has been properly disposed of, once again, such as in a wastewater treatment plant, composting facility, sanitary landfill, etc. In one further embodiment, the plurality of partition members 132 are constructed of a material which may be disposed of after one or more uses after pet waste which had been contained in a corresponding waste receptacle 111 has been properly disposed of, once again, such as in a wastewater treatment plant, composting facility, sanitary landfill, etc., and in one further embodiment, the plurality of partition members 132 are constructed of a biodegradable material such that they may be properly disposed of after use along with the pet waste.

In at least one embodiment, each of a plurality of waste compartments 138 is dimensioned and configured to receive an amount of pet waste accumulated in a single day therein. In yet one further embodiment, a plurality of partition members 132 are disposable into an internal volume 116 of a waste receptacle 111 to separate an internal volume 116 into a total of eight waste compartments 138, such that all but one of the plurality of waste compartments 138 is intended to contain the amount of pet waste accumulated in a single day therein.

It will be appreciated by those of skill in the art, once again, that a waste receptacle 111 of a pet waste receptacle assembly 110 in accordance with the present invention may be dimensioned so as to accommodate containment of the amount of pet waste accumulated in a single day from a small pet, a medium size pet, a large pet, or multiple pets, in each of a plurality of waste compartments 138. More in particular, a pet waste receptacle 111 of a pet waste receptacle assembly 110 may comprise any of a number of nominal internal volumes 116, such as, by way of example, one gallon, three gallons, five gallons, fifteen gallons, etc.

Figure 5:
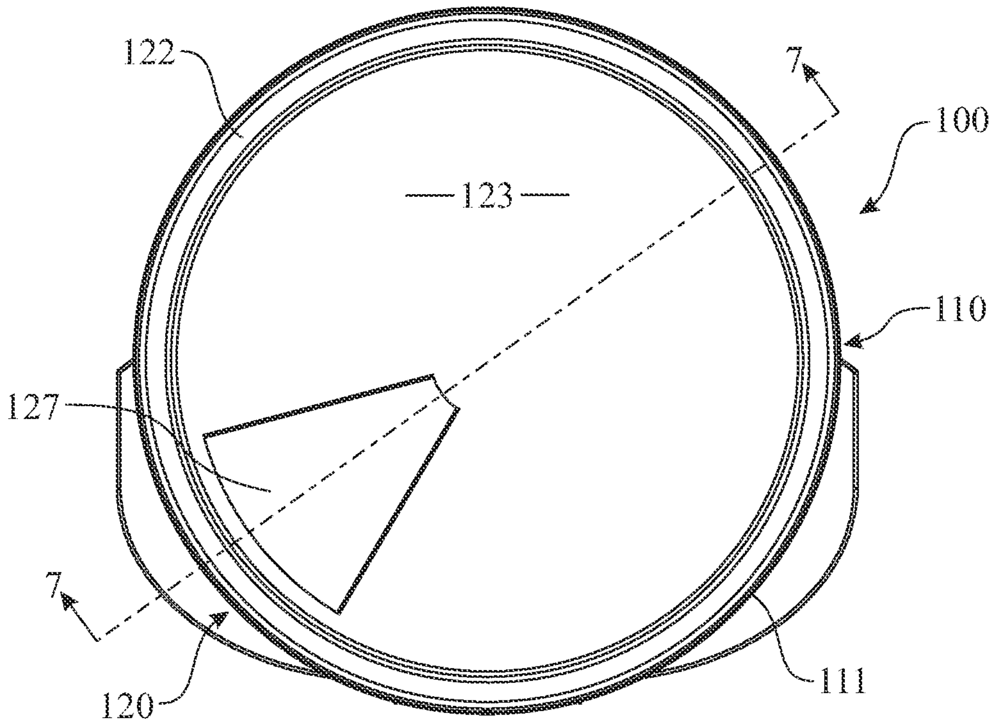
FIG. 5 presents a top plan view of one illustrative embodiment of a pet waste containment and disposal system with an access port disposed in a first receiving position, in accordance with the present invention.

In use, the present pet waste containment and disposal system 100 may be staged in the vicinity of garbage collection cans, recycle bins, etc., at a home, apartment or other facility. To begin, a cover member 122 of a cover assembly 120 is rotated into a first position, for example, such as is shown in FIG. 5, so that an access port 127 through a closed top 123 of the cover member 122 is aligned over a first of a plurality of waste compartments 138 in an internal volume 116 of a waste receptacle 111 of a pet waste receptacle assembly 110. The cover member 122 is rotated relative to the open top 112 of the waste receptacle 111 while maintaining a sealing orientation therewith, so as to, once again, prevent the release of pet waste odors from the pet waste contained in the waste receptacle 111. It will be appreciated by those of skill in the art that indicia may be disposed on the outside of the sidewall 115 of the waste receptacle 111 so as to facilitate alignment of the access port with a desired one of the plurality of waste compartments 138. As one example, an indicia may be a simple vertical mark denoting a centerline of a corresponding one of the plurality of waste compartments, and as another example, indicia may comprise the days of the week, Monday through Sunday with one waste compartment left blank.

The pet waste accumulated on a particular day of the week is placed into a waste compartment 138 of a waste receptacle 111 corresponding to the day of the week by opening the access hatch 128 while the access port 127 is aligned over the waste compartment 138 for the corresponding day of the week, after which, the access hatch 128 is returned to a closed orientation relative to the access port 127 so as to prevent a release of pet waste odors from pet waste contained in the waste receptacle 111 to the surrounding environment. With reference next to FIG. 6, the cover member 122 is then rotated to a second position, such as by way of example, in the direction of the arrow in FIG. 6, such that the access port 127 is aligned over a different one of the plurality of waste compartments 138. The cover member 122 of the cover assembly 120 may be rotated in this manner for each corresponding day of the week relative to the open top 112 of the waste receptacle 111 such that the access port 127 is aligned over the waste compartment 138 for each corresponding day of the week and the process repeated.

At the end of a week, the waste receptacle 111 containing the pet waste accumulated during the preceding week and having the cover member 122 disposed in a sealing orientation thereto is collected and transported to a disposal facility for proper disposal of the pet waste, and a clean pet waste receptacle assembly 110 having a cover assembly 120 disposed in a sealing orientation thereto and a partition assembly 130 disposed therein is positioned in its place ready for use in the upcoming week. Importantly, by placing pet waste into a pet waste receptacle 111 having a cover member 122 disposed in a sealing orientation in accordance with the present invention, the pet owner, neighbors, as well as collection, transport and disposal personnel are protected from the noxious and potentially dangerous pet waste odors emanating from the pet waste contained in a pet waste receptacle 111 in accordance with the present invention.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A pet waste containment and disposal system provides sanitary storage of an amount of pet waste prior to collection, transport and proper disposal thereof and reduces a release of pet waste odors to a surrounding environment, said system comprising:

a pet waste receptacle assembly having a waste receptacle to contain the amount of pet waste having an open top, a closed bottom and a sidewall disposed therebetween, said closed bottom and said sidewall cooperatively defining an internal volume of said waste receptacle;

a cover assembly comprising a cover member having a closed top and an outer sidewall disposed therearound, said cover member dimensioned and configured for disposition into an overlying relation to said open top of said waste receptacle in a sealing orientation therewith to reduce the release of pet waste odors from the amount of pet waste contained in said waste receptacle to the surrounding environment;

a partition assembly having at least one partition member disposable into said internal volume of said waste receptacle separating said internal volume into a plurality of waste compartments, wherein each of said plurality of waste compartments is dimensioned and configured to receive a portion of the amount of pet waste therein; and said cover assembly further comprising a seal member operatively positioned in a seal seat on said waste receptacle, wherein said sealing orientation is at least partially defined by said outer sidewall of said cover member disposed in an abutting relation to said seal member while said cover member is disposed in said overlying relation to said open top of said waste receptacle, and further wherein said seal member comprises a vapor resistant or vapor impermeable material of constructions such that when disposed into an abutting relation to the outer sidewall of the cover member, said seal member is adapted to reduce a release of pet waste odors from the pet waste contained in the pet waste receptacle to the surrounding environment.

2. The pet waste containment and disposal system as recited in claim 1 wherein said pet waste receptacle assembly further comprises a handle connected to said waste receptacle to facilitate maneuvering said waste receptacle during collection, transport and proper disposal of the pet waste contained therein.

3. The pet waste containment and disposal system as recited in claim 2 wherein said waste receptacle further comprises at least one handle interconnect, said handle connected to said waste receptacle via said handle interconnect.

4. The pet waste containment and disposal system as recited in claim 1 wherein said waste receptacle further comprises an upper rim disposed around an uppermost periphery of said sidewall.

5. The pet waste containment and disposal system as recited in claim 4 wherein said cover member further comprises a channel disposed between said outer sidewall and said closed top, said channel dimensioned and configured to operatively engage said upper rim of said waste receptacle in a sealing engagement.

6. The pet waste containment and disposal system as recited in claim 5 wherein said sealing orientation is at least partially defined by said channel of said cover member operatively engaging said upper rim of said waste receptacle.

7. The pet waste containment and disposal system as recited in claim 1 wherein said cover member comprises an access port disposed through a portion of said closed top, said access port aligned with at least one of said plurality of waste compartments to allow disposal of the portion of the amount of pet waste thereinto while said cover member remains disposed in said overlying relation to said open top of said waste receptacle.

8. The pet waste containment and disposal system as recited in claim 7 wherein said cover member is positionable relative to said open top of said waste receptacle such that said access port may be aligned with a different one of each of said plurality of waste compartments to allow disposal of the portion of the amount of pet waste into each of a different selected one of said plurality of waste compartments.

9. The pet waste containment and disposal system as recited in claim 8 wherein said cover member further comprises an access hatch disposable between an open orientation and a closed orientation relative to said access port, said open orientation at least partially defined by permitting access into and out of a corresponding one of said plurality of waste compartments over which said access port is aligned, and said closed orientation at least partially defined by preventing access into or out of said corresponding one of said plurality of waste compartments over which said access port is aligned.

10. The pet waste containment and disposal system as recited in claim 7 wherein said cover member further comprises an access hatch disposable between an open orientation and a closed orientation relative to said access port, said open orientation at least partially defined by permitting access into and out of said at least one of said plurality of waste compartments, and said closed orientation at least partially defined by preventing access into or out of said at least one of said plurality of waste compartments.

11. The pet waste containment and disposal system as recited in claim 1 wherein said partition assembly comprises a plurality of partition members disposable into said internal volume of said waste receptacle separating said internal volume into said plurality of waste compartments.

12. The pet waste containment and disposal system as recited in claim 11 wherein said plurality of partition members separate said internal volume into a total of eight waste compartments such that all but one of said plurality of waste compartments is utilized to contain the amount of pet waste accumulated in a single day.

13. A pet waste containment and disposal system provides sanitary storage of an amount of pet waste prior to collection, transport and proper disposal thereof and reduces a release of pet waste odors to a surrounding environment, said system comprising:

a pet waste receptacle assembly having a waste receptacle to contain the amount of pet waste having an open top, a closed bottom and a sidewall disposed thereinbetween, said sidewall having an upper rim disposed around an uppermost periphery thereof, said closed bottom and said sidewall cooperatively defining an internal volume of said waste receptacle;

a cover assembly comprising a cover member having a closed top and an outer sidewall disposed therearound, said cover member dimensioned and configured for disposition into an overlying relation to said open top of said waste receptacle and at least partially defining a sealing orientation therewith to reduce the release of pet waste odors from the amount of pet waste contained in said waste receptacle to the surrounding environment;

said cover member further comprises a channel disposed between said outer sidewall and said closed top, said channel dimensioned and configured to operatively engage said upper rim of said waste receptacle in a sealing engagement, wherein said sealing orientation is at least partially defined by said channel of said cover member operatively engaging said upper rim of said waste receptacle, and further wherein said seal member comprises a vapor resistant or vapor impermeable material of constructions such that when disposed into an abutting relation to the outer sidewall of the cover member, said seal member is adapted to reduce a release of pet waste odors from the pet waste contained in the pet waste receptacle to the surrounding environment; and a partition assembly having a plurality of partition members disposable into said internal volume of said waste receptacle separating said internal volume into a plurality of waste compartments, wherein each of said plurality of waste compartments is dimensioned and configured to receive the amount of pet waste accumulated in a single day.

14. The pet waste containment and disposal system as recited in claim 13 wherein each of said plurality of partition members comprises an upper end, a lower end, an outer edge and an interface, a partition wall at least partially defined between corresponding ones of said upper end, said lower end, said outer edge and said interface of each of said plurality of partition members.

15. The pet waste containment and disposal system as recited in claim 14 wherein each of said plurality of partition members is tapered in a downward direction from said upper end to said lower end along said outer edge thereof.

16. The pet waste containment and disposal system as recited in claim 15 wherein said waste receptacle comprises a tapered configuration extending downward along said sidewall from said upper rim to said closed bottom.

17. A pet waste containment and disposal system provides sanitary storage of an amount of pet waste prior to collection, transport and proper disposal thereof and reduces a release of pet waste odors to a surrounding environment, said system comprising:

a pet waste receptacle assembly having a waste receptacle to contain the amount of pet waste having an open top, a closed bottom and a sidewall disposed thereinbetween, said closed bottom and said sidewall cooperatively defining an internal volume of said waste receptacle;

said pet waste receptacle assembly further comprising a handle connected to said waste receptacle to facilitate maneuvering said waste receptacle during collection, transport and proper disposal of the pet waste contained therein;

a cover assembly comprising a cover member having a closed top and an outer sidewall disposed therearound, said cover member dimensioned and configured for disposition into a positionable overlying relation to said open top of said waste receptacle and at least partially defining a sealing orientation therewith to reduce the release of pet waste odors from the amount of pet waste contained in said waste receptacle to the surrounding environment;

said cover assembly further comprising a seal member operatively positioned in a seal seat on said waste receptacle, wherein said sealing orientation is at least partially defined by said outer sidewall of said cover member disposed in an abutting relation to said seal member while said cover member is disposed in said overlying relation to said open top of said waste receptacle, and further wherein said seal member comprises a vapor resistant or vapor impermeable material of constructions such that when disposed into an abutting relation to the outer sidewall of the cover member, said seal member is adapted to reduce a release of pet waste odors from the pet waste contained in the pet waste receptacle to the surrounding environment;

a partition assembly having a plurality of tapered partition members disposable into said internal volume of said waste receptacle separating said internal volume into a plurality of waste compartments, wherein each of said waste compartments is dimensioned and configured to receive the amount of pet waste accumulated in a single day;

said cover member further comprising an access port disposed through a portion of said closed top, wherein said cover member is positionable relative to said open top of said waste receptacle such that said access port may be aligned with a different selected one of said plurality of waste compartments to allow disposal of the amount of pet waste into said selected one of said plurality of waste compartments; and said cover member further comprises an access hatch disposable between an open orientation and a closed orientation relative to said access port, said open orientation at least partially defined by permitting access into and out of a corresponding one of said plurality of waste compartments over which said access port is aligned, and said closed orientation at least partially defined by preventing access into or out of said a corresponding one of said plurality of waste compartments over which said access port is aligned.

* * * * *